United States Patent [19]

Di Matteo

[11] 4,392,182
[45] Jul. 5, 1983

[54] ARRANGEMENT FOR SCANNING POINTS IN SPACE

[75] Inventor: Paul Di Matteo, Huntington, N.Y.

[73] Assignee: Solid Photography, Inc., Melville, N.Y.

[21] Appl. No.: 273,044

[22] Filed: Jun. 12, 1981

[51] Int. Cl.³ .............................................. G03B 15/02
[52] U.S. Cl. ......................................... 362/5; 362/17; 362/35; 362/297; 362/308; 356/375; 356/376
[58] Field of Search ................ 250/558; 356/376, 375, 356/156; 362/5, 297, 17, 308, 35

[56] References Cited

U.S. PATENT DOCUMENTS

| 3,783,266 | 1/1974 | Gregg | 362/35 |
|---|---|---|---|
| 4,145,991 | 3/1979 | Di Matteo et al. | 356/156 |
| 4,175,862 | 11/1979 | Di Matteo et al. | 356/156 |
| 4,185,918 | 1/1980 | Di Matteo et al. | 356/156 |
| 4,259,017 | 3/1981 | Ross et al. | 356/375 |
| 4,259,589 | 3/1981 | Di Matteo et al. | 250/558 |
| 4,269,513 | 5/1981 | Di Matteo et al. | 356/376 |

*Primary Examiner*—Stephen J. Lechert, Jr.
*Attorney, Agent, or Firm*—Max Fogiel

[57] ABSTRACT

An arrangement is disclosed, in form of various embodiments, for more rapid scanning of an addressed point in space with programmable angular relationships, using either merely rotary motion for angle and reduced motion for position in two or three dimensions, or simply rotary motion for displacement with a consistent angular relationship in two or three dimensions.

6 Claims, 6 Drawing Figures

ARRANGEMENT FOR SCANNING POINTS IN SPACE

BACKGROUND OF THE INVENTION

The present invention relates to scanning of an addressed point in space.

More particularly, the invention relates to a more rapid means of scanning an addressed point in space with programable angular relationships, with only rotary motion for angle and reduced motion for position in two or three dimensions, or with simply rotary motion for displacement with a consistent angular relationship in two or three dimensions.

The means for implementing scanning of an addressed point in space have heretofore been rather elaborate and the operation relatively cumbersome. This invention aims to overcome these disadvantages.

SUMMARY OF THE INVENTION

It is, accordingly, an object of the present invention to overcome prior-art disadvantages.

A more particular object of the invention is to provide a more rapid manner of scanning an addressed point in space with programable angular relationships.

A concomitant object is to achieve the above objects, using either merely rotary motion for angle and reduced motion for position in two or three dimensions, or merely rotary motion for displacement with a consistent angular relationship in two or three dimensions.

The above objects, and still others which will become apparent hereafter, are achieved in an arrangement for scanning an addressed point in space, comprising a light source; a camera at which light from the light source is directed; deflector means interposed between the source and camera and through which light can pass from the source to the camera and rotary addressing mirror means in the path of the light intermediate said deflector means and camera, so that light from the source is deflected by the addressing mirror means to the deflector means, from there to the addressed point in space, and from there via the deflector means and the addressing means to the camera.

The invention will hereafter be described with reference to exemplary embodiments, as illustrated in the appended drawings. However, these are to be understood as being for purposes of explanation only and not to have any limiting intent or effect.

DESCRIPTION OF PREFERRED EMBODIMENT

Figure 1:
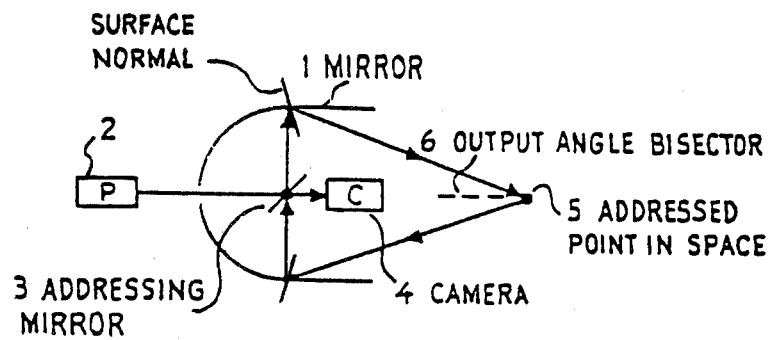
FIG. 1 is a diagrammatic illustration showing one embodiment of the invention.

In the embodiment of FIG. 1 the reference numeral 5 identifies an addressed point in space (i.e. anywhere in three-dimensional space, not limited to so-called "outer" space). An addressing mirror 3 is rotatable about a fixed axis and is surrounded with clearance by a parabolic, spherical, etc., mirror 1. With rotary mirror 3 positioned at 45° to the optical axis of the mirror 1, the output angle bisector 6 will be located on the main optical axis.

FIG. 1 shows the technique operating in two dimensions; however, motion into or out of the plane of FIG. 1 can be used by employing a three-dimensional (spherical, parabolic, etc.) mirror 3 in order to accomplish three-dimensional rotation of the output angle bisector about the point 5. This is particularly useful when it is desired to find a three-dimensional point on a shiny object, where light returns to the camera 4 only when the angular bisector 6 coincides with a line normal to the shiny surface. Reference numeral 2 identifies the plane (if scanning is two-dimensional) or the ray of light (if scanning is three-dimensional) of a light projector having its output directed towards the mirror 3 through an appropriate opening in the mirror 1.

Changing the address point 5 in space by either moving the entire system or moving just the items 2, 3 and 4 within the image space of mirror 1, will facilitate reduced address motion. It will be appreciated by those skilled in the art that image points occur to the left of the mirror's focal point, as drawn. Angles may be calculated or, preferably may be calibrated by taking samples and later using a computer-memory as a reference table.

Figure 5:
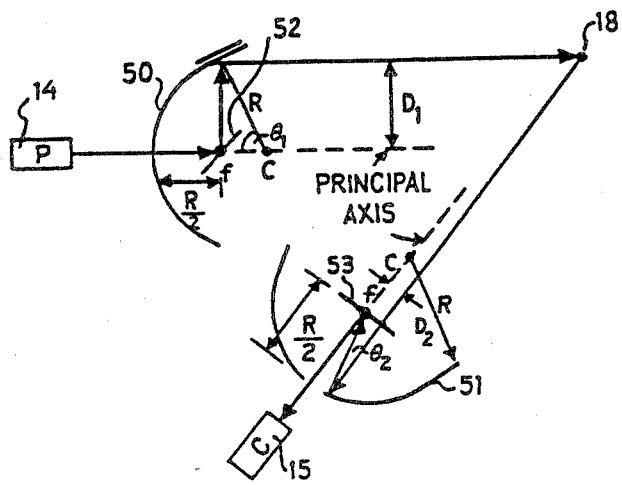
FIG. 5 is similar to FIG. 1, but of still an additional embodiment.

FIG. 5 shows the same embodiment, which is why all elements have the same reference numerals as before. However, here the rotary mirror 3 has been rotated to a 30° angle relative to the optical axis of the main mirror 1, so that the angular bisector 6 is no longer located on the main optical axis, but has rotated around the addressed point 5 in space.

Figure 3:
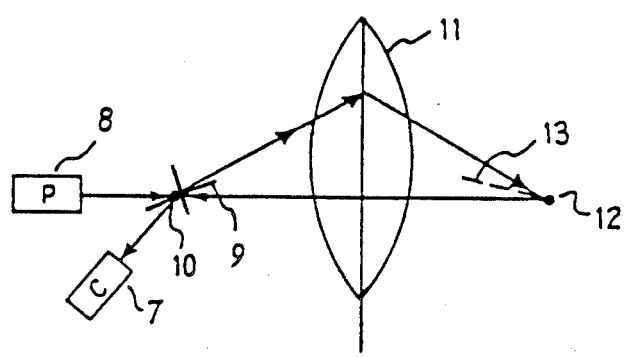
FIG. 3 is another diagrammatic view of yet a further embodiment.

In the embodiment of FIG. 3 the reference numeral 7 identifies a camera or photocell, reference numeral 8 a light projector which projects a light plane (two-dimensional, cylindrical geometry) or a ray of light (for three-dimensional, spherical geometry).

A rotary mirror is identified by reference numeral 9 and reference numeral 10 is the point of rotation (of mirror 9) and focal point of the light. Element 11 is a lens which is cylindrical for two-dimensional applications but must be spherical for three-dimensional applications. Numeral 12 is the output focal point of the arrangement and 13 is the output angle bisector.

Figure 2:
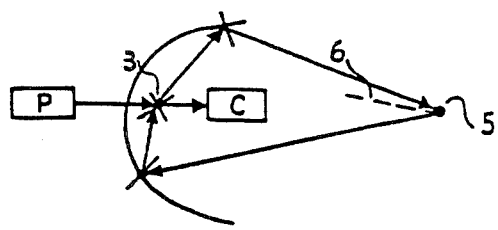
FIG. 2 is a view similar to FIG. 1 but showing the embodiment in another operating position.

In this embodiment a rotation of mirror 9 about point 10 causes the output angle bisector 13 to rotate about focal point 12. The utility of this embodiment is the same as in FIGS. 1 and 2. If both the camera 7 and the projector 8 are mounted on a common fixture which is capable of rotating the point 10, then the mirror 9 can be omitted; this is preferable in those cases where the embodiment is intended for three-dimensional applications.

Figure 4:
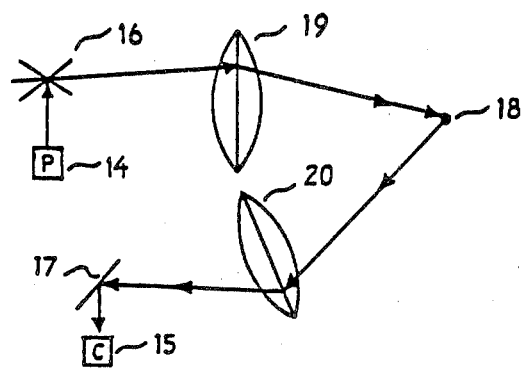
FIG. 4 is similar to FIG. 3 but showing another embodiment.

The embodiment of FIG. 4 uses a projector 14, a camera 15, two rotary mirrors 16 and 17 associated with projector 14 and the camera 15, respectively, and two lenses 19 and 20. The addressed point in space is identified with reference numeral 18 and the direction of the light flow is designated by the arrowheads. This embodiment is thus a modification of the one in FIG. 3.

In FIG. 5 the projector, camera and addressed point in space are again identified with reference numerals 14, 15 and 18, respectively. There are two spherical mirrors 50 and 51, although parabolic or other convex mirrors may also be used with a different angle-to-displacement formula.

Each of the mirrors 50, 51 has the usual opening for passage of light rays and mounted within the confines of the mirrors are rotary (i.e. tilt) mirrors 52, 53 respectively. Both the projector light beam and the camera light beam each travel through the focal point of their associated mirrors 50, 52. Note that light entering the mirror's focal point must leave parallel to the mirror's principal axis, but that the reverse is true of received light.

Each of the mirrors 50, 51 has the usual opening for passage of light rays and mounted within the confines of these mirrors are rotary (i.e. tilt) mirrors 52, 53, respectively. Both the projector light beams and the camera light beam each travel through the focal point of their associated mirrors 50, 51. Note that light entering the mirror's focal point must leave parallel to the mirror's principal axis, but that the reverse is true of received light.

The displacement D for an ideal spherical lens can be calculated by the formula SIN ($\theta/2$). The preferred (because more accurate) method is to calibrate displacement distance versus angle, using e.g. a computer memory.

Figure 6:
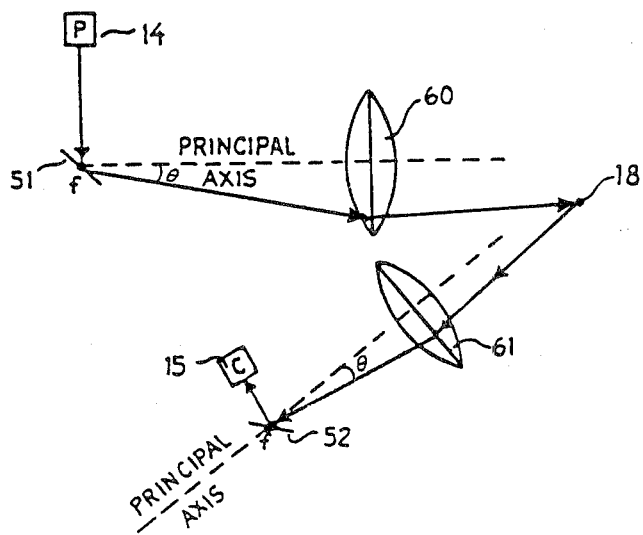
FIG. 6 is a view analogous to FIG. 4 but illustrates yet another embodiment of the invention.

The embodiment of FIG. 6 is different in that it uses lenses 60, 61; the other reference numerals denote like elements as in FIG. 4. Light passing through the focal point of the lens emanates from the respective lens parallel to its principal axis. Displacement from the axis D is calculated to be $D = f^* \text{TAN}(\theta)$.

While the invention has herein been described with reference to specific embodiments, it is not to be limited thereto inasmuch as any modifications within the skill of the art are intended to be encompassed within the scope of the appended claims.

What is claimed is:

1. Arrangement for scanning an addressed point in space, comprising: a light source; a camera at which light from a light source is directed; deflector means interposed between said source and camera and through which light can pass from the source to the camera; and rotary addressing mirror means in the path of the light intermediate said deflector means and camera, so that light from the source is deflected by the addressing mirror means, from there to the addressed point in space, and from there via the deflector means and the addressing mirror means to the camera.

2. Arrangement as defined in claim 1, said deflector means comprising a concave mirror and said addressing mirror means comprising a single reflecting mirror.

3. Arrangement as defined in claim 1, said deflector means comprising a pair of lenses, one interposed between said source and addressed point and the other interposed between said addressed point and camera, said addressing mirror means comprising two rotary addressing mirrors each interposed between one of said lenses and said source and camera, respectively.

4. Arrangement as defined in claim 1, said deflector means comprising a lens, and said addressing mirror means comprising a single addressing mirror interposed in the light from said source, between the same and said lens.

5. Arrangement as defined in claim 1, wherein said deflector means comprises two concave mirrors each having at its zenith an opening for passage of light said addressing mirror means comprising two rotary addressing mirrors each turnably mounted at the focal point of the respective concave mirror in the path of light travelling through the respective opening.

6. Arrangement as defined in claim 1, wherein said deflector means comprises a pair of lenses each interposed between the addressed point and one of said source and camera, respectively, said addressing mirror means comprising a pair of addressing mirrors each interposed between one of said lenses and said source and camera, respectively, and each turnable about a pivot intersected by the principal axis of the associated lens.

* * * * *